March 1, 1949. B. P. DAWES 2,463,155
ROTARY ENGINE
Filed April 10, 1944 4 Sheets-Sheet 1

INVENTOR.
BAILEY P. DAWES
BY
Boyken, Mohler & Beckley
ATTORNEYS.

March 1, 1949. B. P. DAWES 2,463,155
ROTARY ENGINE
Filed April 10, 1944 4 Sheets-Sheet 3

INVENTOR.
BAILEY P. DAWES
BY
Boykin, Mohler & Beckley
ATTORNEYS.

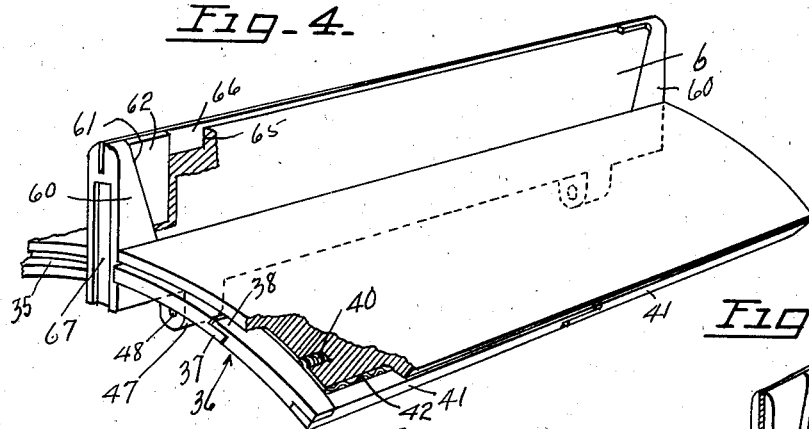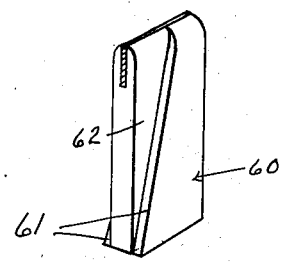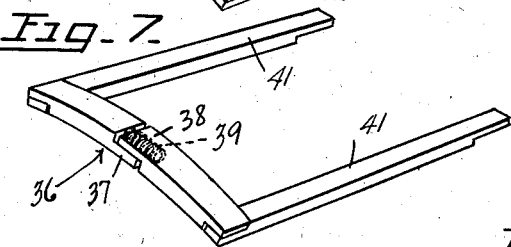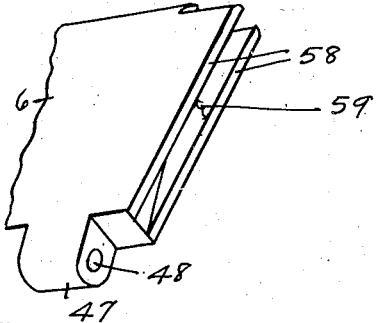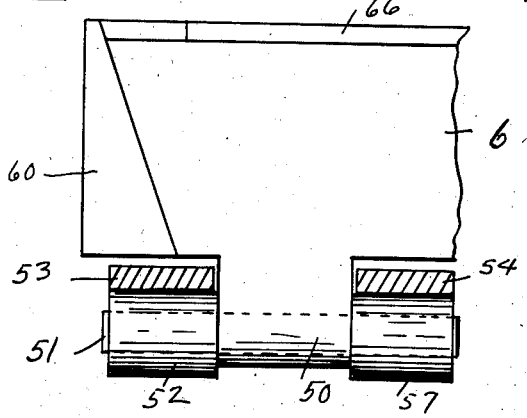

Patented Mar. 1, 1949

2,463,155

UNITED STATES PATENT OFFICE 2,463,155

ROTARY ENGINE

Bailey P. Dawes, Pacific Grove, Calif.

Application April 10, 1944, Serial No. 530,414

5 Claims. (Cl. 121—85)

This invention relates to rotary engines.

One of the objects of this invention is the provision of a rotary engine that is more efficient than heretofore and which engine is economical to manufacture in any desired size and is economical to operate as compared with other engines of the same size and horsepower.

Another object of the invention is the provision of a rotary engine that has a higher degree of flexibility in its operations than heretofore in engines of the same general type or of other types, and one that does not require the use of reduction gears, but which can be directly connected with the machine or device it is intended to actuate.

A still further object of the invention is the provision of a rotary engine in which objectionable friction losses heretofore present are eliminated, or are at least radically reduced.

An additional object is the provision of a more smoothly operating engine of its type than heretofore, and one that has the high desirable torque features of the reciprocating engine combined with the efficiency of operation of a steam turbine but without the necessity for using reduction gears and other disadvantages of the turbine, and which engine is instantly reversible with full power in either direction.

Other objects and advantages will appear in the specification and drawings annexed hereto.

In the drawings, Fig. 1 is a diagrammatic view showing the operation of the engine, diagrammatically.

Fig. 4 is a fragmentary perspective view (partly broken away and in section) of one of the rotor blades and several of the sector plates at opposite sides of each blade.

Fig. 5 is a perspective view of one of the end seals of a rotor blade, the longitudinal edge sealing strip of the blade being in section.

Fig. 6 is a perspective fragmentary view of one end of the rotor blade that is adapted to receive the end seal of Fig. 5.

Fig. 7 is a perspective view of one of the edge sealing members of a rotor sector plate.

Fig. 8 is an enlarged fragmentary perspective view of one of the rotor blade spacer rings showing the slots for a pin carried by each of the rotor blades.

Fig. 9 is an enlarged fragmentary elevational view of one end of a slightly modified rotor blade and end ring than shown in Figs. 4, 8, in which rollers are carried by the blade pin, and only an outer retainer ring is used instead of one having slots such as is shown in Fig. 8.

Figure 1:
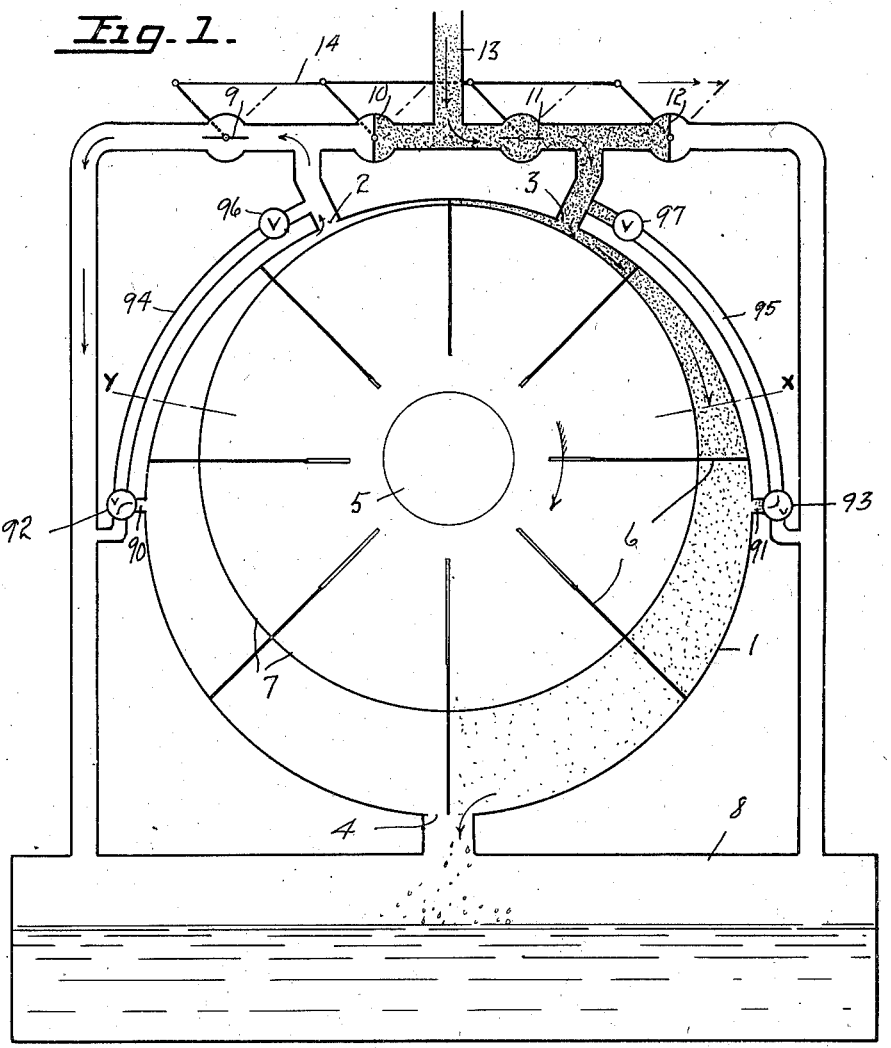

Broadly, the basic elements of the engine are diagrammatically illustrated in Fig. 1. These comprise a cylindrical axially elongated housing 1 having a pair of circumferentially spaced ports 2, 3 at one side, either of which may be a fluid inlet according to the desired direction of rotation of the engine rotor. In Fig. 1 port 3 is the inlet. An exhaust port 4 is in the side of the housing at a point approximately opposite the side having ports 2, 3.

Eccentrically positioned within housing 1 is the drive shaft 5 of the rotor. The axis of shaft 5 is parallel with the housing axis, and extending radially of the axis of shaft 5 is a plurality of rotor blades 6 that are connected with said shaft for revolving therewith.

Spacing the blades 6 are arcuate sector plates 7 that define segments of a cylinder concentric with the axis of shaft 5, and the outer surface of which almost touches the inner surface of the housing 1 along a line parallel with the axis of the latter and exactly midway between ports 2, 3. Blades 6 are slidable radially of shaft 5 between the adjacent edges of the adjacent pairs of sector plates 7, said plates being rigidly connected with shaft 5 for rotation therewith and for equally spacing them from the axis of said shaft.

The exhaust port 4 may be connected with a condenser 8, and valves 9, 10, 11, 12 are associated with ports 2, 3 and are connected together so as to enable their simultaneous operation for placing either port 2 or 3, as desired, in communication with fluid, such as steam, under pressure in line 13, and to place either of ports 2, 3 in communication with the condenser (or atmosphere) as may be deemed most desirable. In the drawings port 3 is in direct communication with the steam under pressure, while valve 12 prevents the steam from going therepast to the condenser. Valve 9 permits any residual air or steam between the exhaust port 4 and port 2 to pass to the condenser or to the air, and valve 10 prevents any of the steam from line 13 passing to the port 2. By a manipulation of an element, such as handle 14 that connects the valves, the positions of valves 9 to 12 inclusive, is reversed, and then port 2 becomes the steam inlet instead of port 3, and the rotation of the rotor is reversed.

The foregoing is merely descriptive of the basic elements and will be helpful to an understanding of the actual structural details. In any instance, however, it is pertinent to the invention to note that the distance between ports 2, 3 is approximately equal to the distance between the radially outer edges of any pair of adjacent blades 6 that might be adjacent said ports. The spacing of ports 2, 3 is preferably slightly greater to insure against any possibility of both ports communicating at the same time with the space that is between any adjacent pair of blades. Also, with my invention the minimum number of blades 6 that should be used is six, and this number can be increased as desired. The spacing between ports 2, 3 will always remain about constant relative to the spacing between the outer edges of the blades adjacent thereto. Of course if the number of blades is increased for the same sized rotor and housing, then the spacing between ports 2, 3 would be accordingly reduced. Eight blades are shown in the construction illustrated, and as a general rule it can be said that where the steam pressure is higher, there are more blades than where the steam pressure is lower, as will be later explained.

The showing of four valves 9 to 12 and the operating handle connecting them is, of course, for the purpose of clarity in Fig. 1. In actual practice one or two conventional multi-wayed valves would handle all that is done with the four illustrated in Fig. 1. The important thing is the provision of valve means that will quickly switch the flow of steam from one of ports 2, 3 to the other and that will simultaneously open to the atmosphere or to the condenser, whichever port is not used for admitting steam to the rotor.

Rotor housing 1

Figure 2:
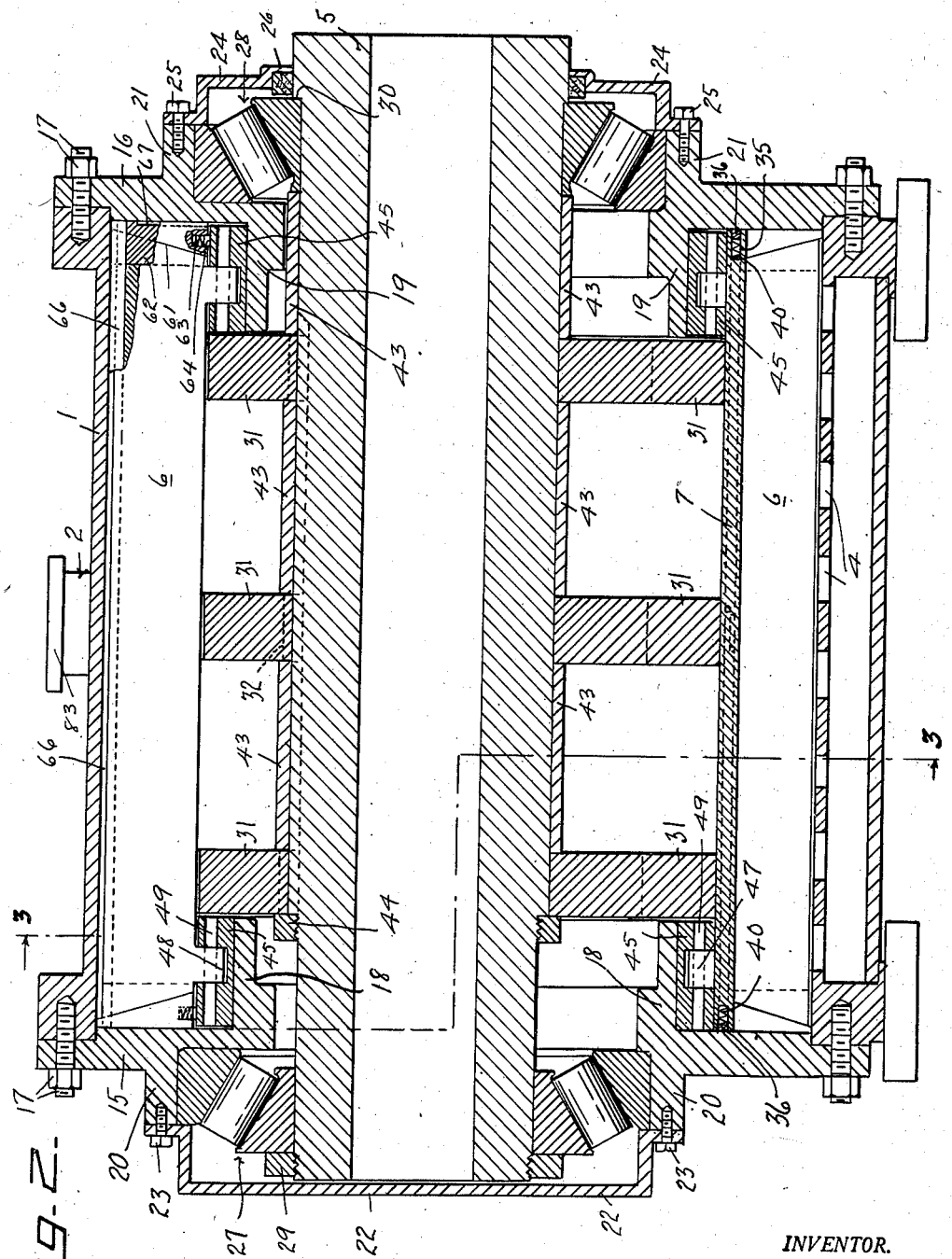
Fig. 2 is a longitudinal sectional view through the engine taken along line 2—2 of Fig. 3.
Figure 3:
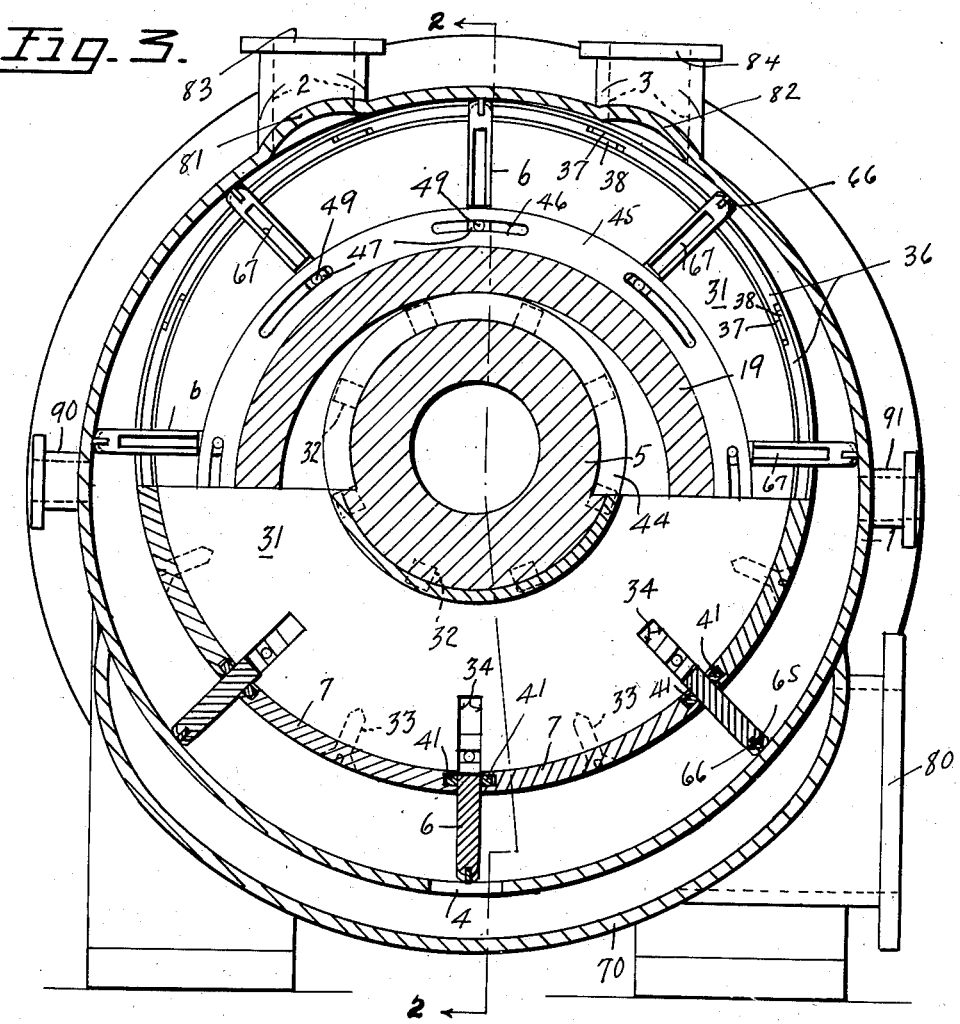
Fig. 3 is a cross-sectional view through the engine taken along line 3—3 of Fig. 2.

As best seen in Figs. 2, 3, the housing 1 is cylindrical and elongated, and is provided at its ends with annular heads 15, 16 that are removably secured by bolts and nuts 17 to the ends of said housing. These heads are in opposed relation in axial alignment and are formed along the edges of their central openings with coaxial concentric annular flanges 18, 19. Flange 18 is on head 15 and flange 19 is on head 16 and said flanges extend toward each other from said opposed heads.

Eccentric relative to flanges 18, 19 and spaced radially outwardly of said flanges 18, 19 and projecting from the oppositely outwardly facing sides of said heads are annular flanges 20, 21, the flange 20 being on head 15 and flange 21 being on head 16. A circular closure plate 22 is removably secured, as by bolts 23 to the axially outwardly facing edges of flange 20, thus coacting with flange 20 to close the end of the housing carrying said flange, while a centrally open plate 24 is removable by bolts 25 to flange 21.

Mounting of shaft 5 (Fig. 2)

Shaft 5, as has been stated, is eccentrically positioned within the housing 1, and in the drawings this offset is vertical or toward the side of the housing in which ports 2, 3 are positioned and away from the side in which the exhaust is located.

The shaft 5 and flanges 20, 21 are concentric and shaft 5 projects outwardly of the housing at one end thereof through the central aperture in annular plate 24. Any suitable coupling may be made between the outwardly projecting end of shaft 5 and whatever element, member or mechanism is to be driven by the shaft. Also said shaft may project any desired distance from said housing. Preferably an annular seal 26 carried by the inner edge of plate 24 makes a sliding sealing contact with the shaft 5.

The shaft 5 may be supported concentric or coaxial with flanges 20, 21 by roller bearings 27, 28 supported in said flanges respectively, or any desired type of bearing may be carried by said flanges. Where roller bearings are used, as is illustrated, the plates 22, 24 may be formed to project radially inwardly of flanges 20, 21 so as to extend slightly over the lateral edge of the outer race of each bearing, and the inner edge of each outer race may engage the axially outwardly facing side of heads 15, 16 respectively. Nut 29 on the end of shaft 5 that is adjacent plate 22 may hold the inner race of the bearing 27 in proper position relative to the outer race while the inner race of the bearing 28 is held in position relative to the rollers by a shoulder 30 on shaft 5.

Sector plates 7

As already explained, sector plates 7 are actually spaced segments that substantially define a cylinder that is concentric or coaxial with shaft 5 and with flanges 20, 21.

The sector plates 7 are secured to the peripheral edges of relatively thick annular plates 31 that are keyed to shaft 5 by keys 32. The said plates 31 are spaced on shaft 5 and the sector plates 7 may be secured thereto by screws 33 (Fig. 3).

These sector plates are spaced apart about the width of the thickness of each blade 6, and the plates 31 are radially slotted at 34 in radially inward continuation of the spacing between sector plates.

Rotation of shaft 5 will result in the sectors revolving about the axis of said shaft in a circular path coaxial with the said shaft, but which plates are offset relative to the central axis of the housing so that the sectors will just clear the inner surface of the housing 1 along a line midway between ports 2, 3 and parallel with the axis of said housing and of shaft 5.

Each sector plate is of the same length and their end edges terminate at the opposed inner surfaces of the heads 16 outwardly of flanges 18, 19.

In order to effectively seal the end edges of the sector plates 7 with the heads 15, 16 and to take up for wear as well as to avoid the necessity for expensive precision machinery of the plates or heads, I provide each of said edges of the plates with a groove 35 (Figs. 2, 4). Slidable in each such groove is a strip 36 that may be centrally split (Fig. 7) and provided with overlapping extensions 37, 38 at the split so that said strip may be axially expansible in each groove without loosing its sealing effectiveness. A spring 39 may react between the separate pieces of each strip to yieldably urge them axially away from each other, and springs 40 may be in recesses formed in the segments 7 and opening into each groove 35 for yieldably urging the seals 36 into engagement with the heads 15, 16 (Fig. 4).

The longitudinal edges of each sector plate are also grooved, and each section of each end sealing strip 36 has a leg 41 secured thereto that slidably fits in each of said grooves (Figs. 3, 4, 7). The legs from the sections in one of the end grooves of each plate are complementarily cut away at their outer ends to overlap each other about centrally of the length of the longitudinal grooves in the same manner as the sections of the end sealing strips overlap each other. Thus longitudinal movement of the legs 41 is permitted without losing the sealing effectiveness of said legs against the blades 6.

Between each of the legs 41 and the base of the groove in which it is positioned may be one or more springs 42 (Fig. 4) such as a wavy leaf spring, for yieldably urging each leg 41 against the blade 6 adjacent thereto.

From the foregoing description it will be seen that each sector plate has a yieldable seal at its end edges with the heads of the housing, and also has a yieldable seal with the blade 7 that is between each adjacent pair of sector plates. This structure provides for an automatic take-up for wear on the sealing strips. Thus better and longer lived seals are provided than were the prohibitively expensive attempts made to machine the sector plates, blades and heads to fit together in sliding sealing relation, as has been attempted in the past.

As is indicated in Fig. 7, the sections of the end seal 36 may each be formed separately from its leg 41 with the adjacent ends of the legs and sections complementarily cut away to overlap at said ends. This structure is merely to facilitate manufacture, since insofar as results are concerned, each section and leg 41 adjacent thereto could be integral.

The plates 31 that carry the sector plates may be spaced from each other and from roller bearing 28 by tubular sleeves 43 slidably supported on shaft 5. A nut 44 threaded on said shaft adjacent bearing 27 may hold the sleeves and plates 31 in tight assembled relation on the shaft 5 as well as securing keys 32 against loosening.

Blades 7 and mounting

On each of the flanges 18, 19 is revolvably supported a channel ring 45 in which the channel opens radially outwardly (Figs. 2, 3). The opposite sides of each channel may be formed with a plurality of pairs of registering slots 46, which pairs are equally spaced around each ring. The rings 45, being on flanges 18, 19, are concentric with the housing, but eccentric to the sector plates.

Each blade 6 is formed along its inner longitudinally extending edge and adjacent its ends with a projecting ear 47, each ear being formed with an opening 48 for a pin 49 that is adopted to extend at its ends in the registering slots 46 of each pair thereof. Thus the blades are positively held by rings 45 against radial movement thereof relative to the housing axis although there may be relative movement of the blades and rings 45 circumferentially of the rings due to the slots 46, which movement is necessary inasmuch as the blades and sector plates revolve about different axes. As seen in Fig. 3, the pins 49 on the blades that are in a common plane bisecting the housing midway between ports 2, 3 are in the centers of slots 46, while the pins on the blades at the opposite sides of said plane are at or near one of the ends of the slots.

In Fig. 9 is shown a structure that is satisfactory in which the blade 6 is identical with those described, except that the ears 50 that correspond with ears 49 are slightly longer so as to enable them to each carry a shaft 51 with rollers 52 at opposite ends of each ear. These rollers may directly roll on the flanges 18, 19 while rings 53, 54 concentric with said flanges will retain the rollers at each end of each blade against radially outward movement relative to the axis housing. In larger engines the structure of Fig. 9 is ordinarily preferred to that of the other figures. However the purpose is exactly the same, namely; to hold the blades from being forced at their outer edges against the inner sides of the housing 1 by centrifugal force.

The opposite ends of each blade 6 are respectively cut off at a similar angle in a manner to provide slanted end edges 58 that extend divergently outwardly relative to the inner longitudinal edge of each blade, and said end edges are each formed with an outwardly opening slot 59 extending longitudinally of each end edge (Fig. 6). Each such slot also opens outwardly at its end that terminates at the longitudinal outer edge of each blade, and the base of each slot extends longitudinally thereof at right angles to the inner and outer edge of each blade.

Each slot 59 is for the purpose of receiving a portion of an end member 60 at each end of each blade. Each such end member is generally rectangular in side elevation (Fig. 5) and may be elongated with its length substantially equal to the width of each blade 6.

Opposite sides of each member 60 are correspondingly cut away to form shoulders 61 that are slanted to correspond to the slanted end edges 58 at the ends of blades 6, while the lip 62 extending away from the inner edges of said shoulders is adapted to slidably fit in the slot 59. Thus the ends of each blade form female portions while the members 60 each comprises a male portion fitting in each of the former. Inasmuch as the shoulders 61 are adapted to slide on end surfaces 58, it is seen that radially outward movement of the end members 60 relative to the axis of housing 1 will result in said end members moving both transversely and longitudinally of the blades 6. When blades 6 and their end members 60 are in the housing 1 in assembled relation the longitudinal edges of said end members will slidably engage the heads of the housing, while the outer end edges of said members will slidably engage the inner peripheral surface of the cylindrical walls of the housing. As any wear occurs on said edges of the end members, the block will automatically move out to compensate for the wear. Preferably a spring 63 is interposed between the inner end of each member 60 and the ring 45 and which spring bears against a brush or block 64 slidable on said ring. The spring thus yieldably urges the member 60 outwardly, particularly when the rotor is revolving at relatively low speeds (Fig. 2), and said spring and brush are held in a recess in each member to prevent their dislodgement.

The outer longitudinal edges of blades 6 and the outer end edges of the members 60 are slotted as at 65 for receiving therein a sealing strip 66. The outer longitudinal edges of blades 7 slightly clear the inner sides of the housing 1, therefore, the strips 66 under centrifugal force created by rotation of the rotor will effect the necessary seal between the blades 6 and the housing, although the end members 60 will contribute to the effective sealing of the space between the end portions of blades 6 and the housing 1. By this structure the only frictional resistance between the rotor and housing walls is that which occurs between the sealing strips 66 and members 60 and the housing. Preferably the outer edges of the members 60 are each provided with an oil groove 67 for oil (Fig. 3).

Inlet and exhaust structure

The exhaust actually constitutes a slot or row of openings extending axially of the housing, which openings communicate between the inside of the housing and a manifold 70 (Fig. 3), there being a conventional fitting 80 on the manifold, if desired, for connection with an exhaust pipe (not shown).

The ports 2, 3 are also respectively in communication with manifolds 81, 82 that open into the housing, so as to permit the substantially immediate distribution of steam between adjacent pairs of blades that successively scan said manifold, the latter tapering from the heads toward the center. The ports 2, 3 are intermediate the ends of said manifolds. Conventionally constructed fittings 83, 84 respectively on manifolds 81, 82 may be provided for pipe connections.

*Operation as illustrated*

In operation, the steam or whatever elastic fluid may be used is admitted into the housing 1 through port 3 (Fig. 1) and immediately the rotor will revolve in the direction of the arrow, in which case the leading blade of each adjacent pair thereof as it moves past port 3 has a progressively increasing area presented to the steam that is larger than the area of the trailing blade of such pair, until the blades of each such pair are equidistant at opposite sides of the exhaust port 4.

Where eight blades are used, as in Fig. 1, the line X indicates the point where steam injection into the space between each adjacent pair of blades is discontinued. Preferably, the steam pressure between such blades at said point is about at that degree above atmospheric pressure that its expansive force is exhausted in driving its share of the load on the rotor by the time the leading blade reaches exhaust port 5. The connection between the exhaust port and the condenser is preferably such that condensation of the exhaust steam will produce a sub-atmospheric pressure at the exhaust port, thus fully evacuating the space between adjacent pairs of blades as such space is in communication with the exhaust port. Normally such evacuation would result in the expenditure of force on the rotor amplifying that of the expanding steam up to a certain point in the rotation of the rotor after which a reverse force might occur, but these forces are relatively unimportant and a connection between the port 2 and the condenser would obviously create a force tending to augment the force created by the expanding steam pressure as soon as the leading blade would uncover port 2, at which time the trailing blade would be at line Y (Fig. 1).

To reverse the direction of rotation of the rotor it is merely necessary to reverse the positions of valves 9 to 12 inclusive and upon such reversal the full power is instantly applied to the rotor for reverse rotation thereof.

To insure against the possibility of any objectionable resistance to rotation of the rotor during movement of the blades from the exhaust port to about line Y, or to line X in the event of reversal of rotation, I provide relief outlets 90, 91 respectively in opposite sides of the housing 1. These outlets may respectively be connected with the condenser 8, and two-way valves 92, 93 may be in the lines that so connect the outlets with the condenser for opening or closing such outlets as may be desired (Fig. 1).

In the drawings (Fig. 1, valve 93 is closed, being on the steam pressure side, while valve 92 is open to exhaust into the condenser.

Lines 94, 95 connect valves 92, 93 with the inlets 2, 3 and valves 96, 97 are respectively in said lines.

Where heavy duty work is to be done it is highly desirable and necessary in some instances to increase the starting torque, in which instance for example, valve 97 is opened and valve 93 is turned to close the communication between the outlet 91 and the condenser, and to open line 95 with said outlet, in which case the latter becomes an inlet. This steam under pressure is admitted to the rotor through port 95 and the starting is greatly facilitated. Once the engine is up to speed, or is well started, the valves 93, 97 may be adjusted to close both line 97 and the port 91, as indicated in Fig. 1. This provision for increasing the power at the start is a quite important feature in engines designed to start heavy loads.

Lubrication is very adequately provided for, since the area inwardly of sector plates 7 may contain oil that is substantially at atmospheric pressure. The slots 34 provide for through communication between plates 31 from end to end of the rotor housing.

Having described my invention, I claim:

1. A rotary engine having a drum-like cylindrical housing provided with heads at its ends and a rotor shaft off-set relative to its central axis rotatably projecting through one of said heads; a plurality of equally spaced sector plates equally spaced around said shaft secured to the latter and defining segments of a cylinder extending from end to end of the housing, one side of said cylinder being substantially in engagement with the inner cylindrical surface of said drum, a plurality of relatively thin, flat blades extending radially of said shaft and respectively positioned slidably between each adjacent pair of said sector plates, metal packing strips carried by said sector plates yieldably engaging opposite sides of each blade, means securing said sector plates to said shaft and spacing them therefrom including spaced disks secured to said shaft for rotation therewith, rings secured to said housing concentric with its cylindrical wall and revolvable about the axis of said housing and connected with said blades for holding the blades in an annular row with their radially outer edges slightly spaced from the inner cylindrical surface of said housing, metal sealing strips light in weight relative to said blades extending between the said outer edges and said inner surface slidably engaging the latter, an inlet port in one side of said cylindrical wall of said housing and an outlet port in the opposite side thereto.

2. In a rotary engine of the character described having a cylindrical housing and a generally cylindrical rotor eccentric within said housing and supported for revolution within the latter about its axis; said rotor comprising a shaft and a plurality of equally sized adjacent pairs of sector plates secured to said shaft for rotation therewith, heads at opposite ends of said housing secured thereto, blades extending radially of said shaft and between adjacent edges of adjacent pairs of said sector plates, metal sealing strips carried by each of said sector plates extending around all edges thereof and disposed between said sector plates and said heads and blades, means yieldably urging said strips outwardly of said sector plates and into yieldable engagement with said heads and said blades, said strips being in overlapping relation at the corners of each sector plate thereby permitting relative movement between the strips along the opposite ends of said plates and those along the blades while maintaining full sealing engagement between the strips and said heads and blades at said corners.

3. In a rotary engine of the character described having a cylindrical housing and a generally cylindrical rotor eccentric within said housing and supported for revolution within the latter about its axis; said rotor comprising a shaft and a plurality of equally sized adjacent pairs of sector plates spaced outwardly of said shaft, means securing said plates to said shaft, a plurality of relatively thin, flat blades respectively extending radially of said shaft and between adjacent edges of adjacent pairs of said sector plates, heads at opposite ends of said housing secured thereto, metal sealing strips carried by adjacent edges of said sector plates in slidable engagement with opposite sides of each blade, and metal sealing strips carried by the opposite ends of each sector plate in sealing engagement with the said heads, said strips at the ends and edges of said sector plates being in overlapping relationship at the corners of said sector plates whereby said sealing strips will extend completely around each sector plate, metal sealing strips carried by the outer edges of said blades in sliding engagement with the inner sides of said housing, and sealing members movable axially and radially of said axis disposed between the ends of said blades and said heads for movement axially of said axis relative to said blades, said members extending radially of said axis past the sealing strips that are around said sector plates, and said sealing strips on said sector plates and at the corners of the latter being in engagement with said members.

4. In a rotary engine of the character described having a cylindrical housing and a generally cylindrical rotor eccentric within said housing and supported for revolution within the latter about its axis; said rotor comprising a shaft and a plurality of equally sized adjacent pairs of sector plates spaced outwardly of said shaft, means securing said plates to said shaft, heads at opposite ends of said housing secured thereto, flat blades respectively extending radially of said shaft and between adjacent edges of adjacent pairs of said sector plates, metal sealing strips carried by said sector plates at opposite ends thereof in sliding engagement with said heads, a pair of said strips in substantially longitudinal alignment being at the end of each sector plate, spring means between the adjacent ends of each such pair yieldably urging them apart, the adjacent ends of each such pair of strips being complementarily offset and in overlapping relationship for forming a continuous sealing surface along the sides of said strips facing said heads.

5. In a rotary engine of the character described having a cylindrical housing and a generally cylindrical rotor eccentric within said housing and supported for revolution within the latter about its axis; a plurality of blades extending between said rotor and housing radially of the axis of said rotor and connected with said rotor for revolving therewith, heads at opposite ends of said housing secured thereto, opposite ends of said blades being spaced from said heads and terminating in edges extending convergently from the outer edges of said blades in direction toward said axis, end members disposed between the ends of said blades and said heads and slidable against said convergently extending edges on said blades for movement axially of said axis and toward said heads upon said members sliding longitudinally of said end edges in direction away from said axis, the edge of each of said members next to each head being formed with an oil groove extending radially of said axis.

BAILEY P. DAWES.

REFERENCES CITED

The following references are of record in the file of this patent:

UNITED STATES PATENTS

| Number | Name | Date |
|---|---|---|
| 152,042 | Manley | June 16, 1874 |
| 280,027 | Garcelon et al. | June 26, 1883 |
| 604,995 | Macey | May 31, 1898 |
| 900,013 | Haudenshield | Sept. 29, 1908 |
| 978,743 | Haudenshield | Dec. 13, 1910 |
| 1,221,333 | Killman | Apr. 3, 1917 |
| 2,274,232 | Boyer | Feb. 24, 1942 |
| 2,382,259 | Rohe | Aug. 14, 1945 |

FOREIGN PATENTS

| Number | Country | Date |
|---|---|---|
| 149,659 | Great Britain | Jan. 26, 1922 |
| 282,263 | Great Britain | Dec. 22, 1927 |
| 458,384 | Germany | Apr. 5, 1928 |
| 538,710 | France | Mar. 22, 1922 |